UNITED STATES PATENT OFFICE.

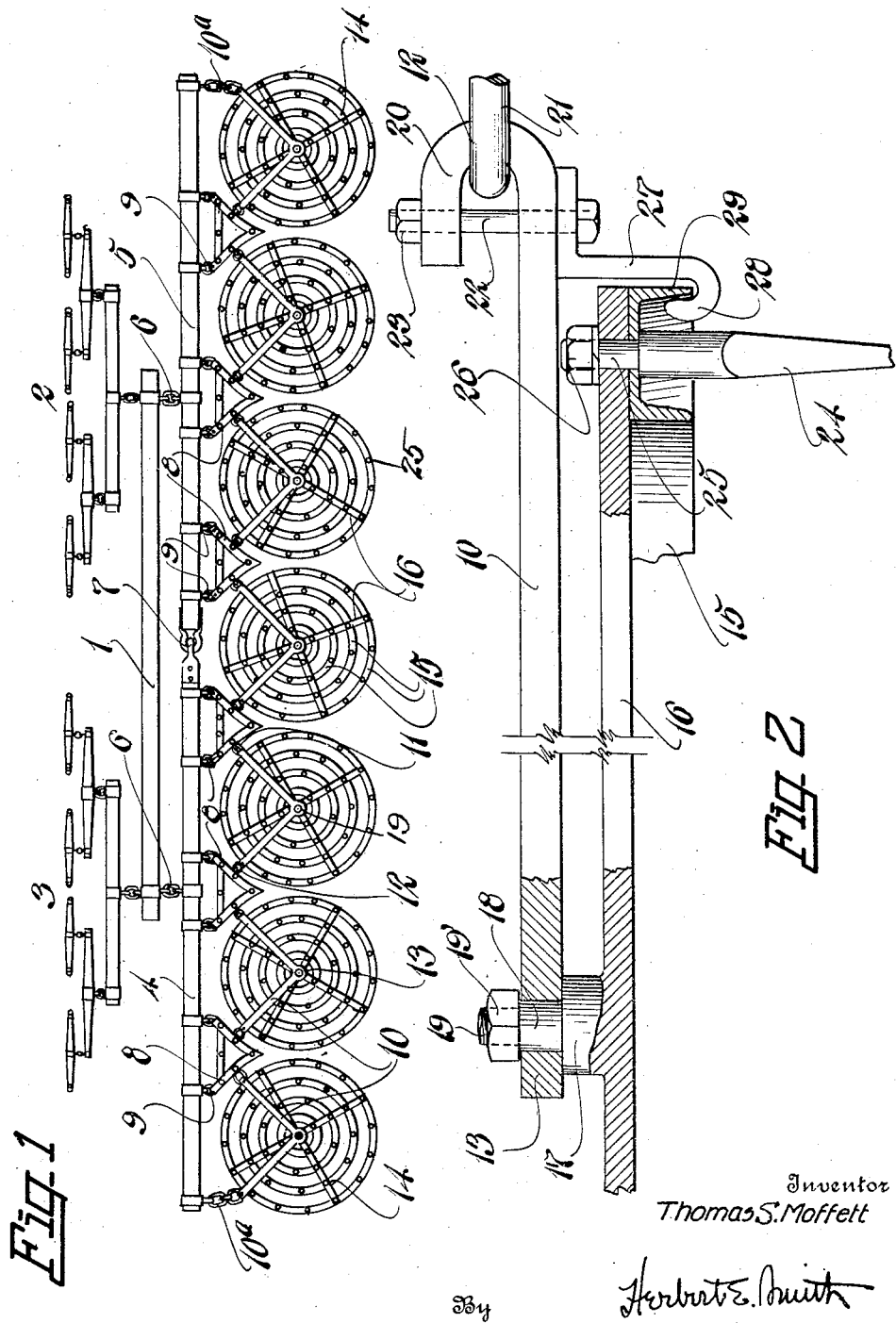

THOMAS S. MOFFETT, OF WALLA WALLA, WASHINGTON, ASSIGNOR OF ONE-HALF TO ARCHIE O. JOHNSON, OF WALLA WALLA, WASHINGTON.

HARROW.

1,362,030.  Specification of Letters Patent.  Patented Dec. 14, 1920.

Application filed March 20, 1920. Serial No. 367,540.

*To all whom it may concern:*

Be it known that I, THOMAS S. MOFFETT, a citizen of the United States, residing at Walla Walla, in the county of Walla Walla and State of Washington, have invented certain new and useful Improvements in Harrows, of which the following is a specification.

My present invention relates to improvements in harrows and is designed to provide an implement of this character by means of which a wide area of ground may be cultivated by the passage thereover of the toothed or spiked harrow members, and which implement is composed of flexibly connected members that are articulated in such manner as to permit the implement to adjust itself to irregularities in the soil, or to obstructions encountered by the harrow members, and to this end the invention contemplates the utilization of an implement of the drag type wherein are combined rotary harrow members for cultivating the soil, as will be hereinafter described.

The invention consists in certain novel combinations and arrangements of draft appliances or devices and harrow members, capable of a rotary movement, as they are dragged, through the instrumentality of the draft devices, and in novel features of construction as embodied in the accompanying drawings wherein I have illustrated one complete example of the physical embodiment of my invention carried out according to the best mode I have so far devised for the practical application of the principles of my invention.

Figure 1 is a plan view of an implement embodying my invention.

Fig. 2 is an enlarged view in elevation, partly broken away for convenience of illustration, and illustrating a portion of a rotary harrow member and its connection with the draft rigging or appliance.

In the preferred form of my invention as illustrated in the drawings I have depicted an eight-horse implement equipped with the draft equalizer bar 1 to which is flexibly attached the draft gear or rigging 2 and 3 for applying horse power in the usual and customary manner.

To the rear of the comparatively long, single equalizer bar 1, are a pair of alined evener bars 4 and 5, coupled as by links 6, 6, at their longitudinal centers, to the respective ends of the equalizer, and the adjoining ends of these evener bars are also flexibly connected together as by coupling links 7, thus providing a flexible and equalized draft appliance for the necessary horse power applied to the implement.

To each of the laterally extending evener bars are attached a series of three draft yokes 8, the yokes of each series being made up in duplicate and consisting of metallic straps of a V-formation and a connecting brace, rigidly attached together as by bolts or rivets, and the projecting ends of these yokes are flexibly connected to the rear of the evener bars by coupling links 9.

The draft yokes are spaced equidistant along the length of the two evener bars, and adjoining yokes are in turn connected by duplicate V-shape brackets 10, the outer arms of the end brackets being connected to the outer ends of the two evener bars by links or chains 10$^a$, and in this manner the triangular yokes and V-shaped brackets are flexibly attached or coupled to the evener bars at regular intervals, the ends of the bracket arms being connected to the adjoining yokes by links as 11 and 12, as shown.

At the apex of each V-shape bracket is formed a hub member 13, in which the harrow frame, indicated as a whole by the numeral 14, is horizontally rotatable, seven of the frames being illustrated as independent elements or units of the implement. The harrow frames are duplicates in construction, and each one comprises a series of concentric, metallic, regularly spaced, rings 15 in the form of channel bars in cross section and of metal, and these rings of the frames are rigidly connected together by the cross bars 16 of the diametrically arranged brace formed thereby.

At the center of each of these cruciform braces is provided an integral boss 17, on the upper side of the brace, which has a reduced head or pin 18 and a threaded end 19 for the clamp nut 19'. The head passes through the hub 13 of the V-shape bracket, and the hub of the latter rests upon the boss 17 as shown in Fig. 2, to permit the head to turn in the hub and thus provide for a rotary movement of the harrow member in the hub.

The two extremities of the V-shape bracket are fashioned with hooks 20, by bending their ends over and upwardly, and these hooks retain the links 21 of the couplings 11 and 12 between the brackets and yokes, a retaining bolt 22 and its nut 23 being employed to confine the link 21 within the hook but permit it a restricted freedom of movement.

The harrow teeth or spikes 24 are arranged at regular intervals around the rings of the harrow members and have their stems 25 passed through openings in the rings of the harrow members and secured by nuts 26 screwed onto the stems at the upper face of the rings, or passing through the cruciform braces the stems have their nuts secured over the braces, as shown in Fig. 2.

Each harrow member or unit 14 is capable of independent rotary movement in its hub, and this movement is guided and confined by a pair of guide brackets 27 for each harrow frame, said brackets being attached to the V-brackets at the under sides of their ends, and the brackets 27 are fashioned with an inwardly extending upward hook 28 extending under and around one of the flanges 28 of the outermost ring 15 of the harrow member.

It will now be obvious that when the harrow member 14 encounters a stone, stump or other obstruction, the contact of the tooth or teeth with the obstruction may readily result in turning the member in its hub, the movement being guided by the two hooked brackets 27. These brackets also relieve the strain in the swiveled joint of the harrow, as the harrow member is dragged over the surface of the ground, by engagement with the outermost ring of the harrow member, and thus the pull on the member is applied at three points i. e. the center of the harrow frame and at the respective ends of the frame or V-shape brackets 11.

Due to its flexibility, the series of harrow members is particularly applicable for use on side hill work, over irregular surfaces, or over ground that is interspersed with obstruction or hard surfaces, and it will readily be apparent that the continual rotary or oscillating movement of the harrow members results in presenting different portions of the spike or tooth ends to the work, thus increasing the durability of the teeth or their points, and providing for a uniform wear of the teeth. The rotary movement of the harrow member also prevents the breaking of the teeth upon encountering an obstruction, and the multiplicity of teeth employed insures a comparatively perfect cultivation of the soil. The flexible articulation of the different parts of the implement permits the implement to ride over and follow the contour of the surface of the ground, in order that the harrow teeth may have a uniform contact resulting in efficient work.

What I claim is—

1. The combination with a draft appliance including an equalizer, and coupled evener bars in alinement, of a series of spaced yokes flexibly coupled to said bars, a series of brackets flexibly coupled to said yokes the end brackets also coupled to the bars, and a harrow member rotatably mounted in each said bracket.

2. The combination with a draft appliance including coupled, alined evener bars, a series of yokes of triangular formation coupled at regular intervals to said bars, a series of V-shaped brackets coupled at their ends to said yokes, and the end brackets also coupled to said bars, of a harrow member rotatably connected with each V-shaped bracket, said harrow member comprising concentrically spaced rings and spaced teeth attached to said rings.

3. The combination in an implement as described including a flexibly coupled V-shaped bracket having a hub member at its apex, of a harrow member formed of concentrically arranged circular members and teeth therein, diametrically arranged braces connecting said circular members, and a pivot head on said braces engaged in said hub.

4. In an implement as described the combination of a rotary harrow member comprising concentrically arranged circular, toothed members, a V-shaped bracket having a supporting hub for said rotary harrow member, and guide brackets on the ends of the arms of the V-shaped bracket for engaging the outermost circular member, for the purpose described.

In testimony whereof I affix my signature.

THOMAS S. MOFFETT.